United States Patent Office 3,707,482
Patented Dec. 26, 1972

3,707,482
CARBAMATE DERIVATIVES OF
2H-PYRAN-3(6H)-ONE
Real Laliberte, Laval, Quebec, Canada, assignor to Ayerst, McKenna and Harrison, Limited, St. Laurent, Quebec, Canada
No Drawing. Continuation-in-part of application Ser. No. 157,705, June 28, 1971, which is a division of application Ser. No. 28,540, Apr. 14, 1970. This application Nov. 2, 1971, Ser. No. 195,045
Int. Cl. C07d 7/20
U.S. Cl. 260—345.8
24 Claims

ABSTRACT OF THE DISCLOSURE

Carbamates of the formula

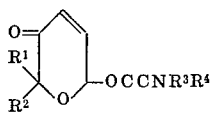

in which $R^1$ represents an aromatic group such as phenyl, benzyloxyphenyl, 3,4 - xylyl, α-hydroxybenzyl, diphenylmethyl, 4-biphenylyl and 4'-chloro-4-biphenylyl; $R^2$ represents hydrogen, lower alkyl, chloromethyl, phenyl, and benzyl; or $R^1$ and $R^2$ together represent the cyclohexane ring attached in spiral fashion to the pyranone ring in such a manner that carbon atom 2 of the pyranone ring is common to the cyclohexane ring; $R^3$ is lower alkyl, phenyl of p-chlorophenyl, and $R^4$ is hydrogen, lower alkyl, phenyl or p-chlorophenyl, with the proviso that when $R^1$ is α-hydroxybenzyl $R^4$ is hydrogen.

The compounds are useful as antibacterial, fungicidal and coccidiostatic agents, and methods for their use and processes for preparing them are also disclosed.

This application is a continuation-in-part of my earlier-filed U.S. patent application Ser. No. 157,705 filed June 28, 1971, now abandoned which is a division of my earlier-filed U.S. Pat. application Ser. No. 28,540, filed Apr. 14, 1970, now U.S. Pat. 3,631,175, issued Dec. 28, 1971.

BACKGROUND OF THE INVENTION

This invention relates to carbamate derivatives of 2-substituted - 6-hydroxy-2H-pyran-3(6H-ones and to processes for their preparation.

The compounds of this invention have valuable antibacterial, fungicidal, and coccidiostatic properties which make them useful as agents for the treatment of certain infectious diseases.

SUMMARY OF THE INVENTION

The carbamate derivatives of this invention may be represented by Formula I

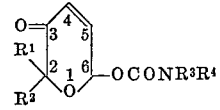

I.

in which $R^1$ represents an aromatic group such as phenyl, 3,4-xylyl, benzyloxyphenyl, α-hydroxybenzyl, diphenylmethyl, 4-biphenylyl and 4'-chloro-4-biphenylyl; $R^2$ represents hydrogen, lower alkyl, chloromethyl, phenyl, and benzyl; or $R^1$ and $R^2$ together represent the cyclohexane ring attached in spiral fashion to the pyranone ring in such a manner that carbon atom 2 of the pyranone ring is common to the cyclohexane ring; $R^3$ is lower alkyl, phenyl or p-chlorophenyl and $R^4$ is hydrogen, lower alkyl, phenyl and p-chlorophenyl, with the proviso that when $R^1$ is α-hydroxybenzyl $R^4$ is hydrogen.

DETAILS OF THE INVENTION

The term "lower alkyl" as used herein contemplates both straight and branched chain alkyl radicals containing from one to six carbon atoms and includes methyl, ethyl, propyl, isopropyl, butyl, 2-methylpentyl and the like.

The carbamates of this exhibit utility as antibacterial agents against a number of gram-positive and gram negative microorganisms, such as Staphylococcus pyogenes, both penicillin sensitive and penicillin resistant, Streptococcus faecalis, Escherichia coli, Aerobacter aerogenes, Salmonella pullorum, Pseudomonas aeruginosa, Proteus mirabilis, Proteus vulgaria, Klebsiella pneumoniae and Serratia marcescens, and as antifungal agents against a number of pathogenic fungi such as Candida albicans, Microsporum gypseum and Trichophyton granulosum in standard tests for antibacterial and antifungal activity, such as those described in "Antiesptics, Disinfectants, Fungicides and Sterilizations," G. F. Reddish, ed., 2nd ed., Lea and Febiger, Philadelphia, 1957 or by D. C. Grove and W. A. Randall in "Assay Methods of Antibiotics," Med. Encycl. Inc., New York 1955.

For example, by employing a test like the serial broth dilution, see Grove and Randall, cited above, in which dilutions, of the compounds of this invention in nutrient broth are inoculated at 37° C. for 2 days, respectively, and examined for the presence of growth it may be shown that 2 - (4 - biphenyl)-2-methyl-6-hydroxy-2H-pyran-3 (6H) - one N,N-dimethylcarbamate is able to inhibit growth totally in this system of Staphylococcus pyogenes, both penicillin sensitive and penicillin resistant, and Pseudomonas aerogenes at a concentration of 12.5 mcg./ml. or less.

When the carbamates of this invention are used as fungicidal agents it is preferred to use them topically in the form of solutions, creams or lotions in pharmaceutically acceptable vehicles. Such formulations for topical use may contain 0.1 to 5.0 percent of the active ingredient, and may be applied topically to infected areas of the skin from one to several times daily.

When the carbamates of this invention are employed as antimicrobial agents in warm-blooded animals, e.g., rats, they may be used alone or in combination with pharmacologically acceptable carriers. The proportion of these compounds is determined by the solubility and chemical nature of the compound, chosen route of administration and standard biological practice. For example, they may be administered orally in solid form containing such excipients as starch, milk sugar, certain types of clay and so forth. They may also be administered orally in the form of suspensions, or they may be injected parenterally.

For parenteral administration they may be used in the form of sterile solution in pharmaceutically acceptable non-aqueous vehicles such as, for example, in vegetable oils, or in suspension or dispersion in aqueous vehicles containing pharmaceutically acceptable suspending or dispersing agents.

The dosage of the present therapeutic agents will vary with the form of administration and the particular compound chosen. Furthermore, it will vary with the particular host under treatment. Generally, treatment is initiated with small dosages substantially less than the optimum dose of the compounds. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 100 mg. per kilo per day, although as aforementioned variations will occur. However, a dosage level that is in the range of from about 1.0 mg. to about 20 mg. per kilo per day is most desirably employed in order to achieve affective results.

For oral use, it is preferred to formulate the carbamates of this invention in the form of tablets, coated tablets, or capsules with the excipients mentioned above and containing from 25–250 mg. of the active ingredient. For parenteral administration the compounds of this invention are preferably dissolved in pharmaceutically acceptable oils, or they are suspended or dispersed in aqueous vehicles containing pharmaceutically acceptable suspending or dispersing agents, and such solutions, dispersions or suspensions may contain from 25–250 mg. of the active ingredient per milliliter.

The carbamates of this invention have been found to possess valuable coccidiostatic activities. For example, when tested by a modification of the method described in "Experimental Chemotherapy" vol. 1, Academic Press, New York and London 1963, those compounds have been found to decrease the severity of infections with *Eimeria tenella* in chickens and so to be useful as coccidostatic agents.

In the modification of the above text, male domestic chickens, 12 to 14 days old, in groups of ten each are inoculated with sufficient sporulated oocysts of *Eimeria tenella* to produce at least 50 percent mortality and substantially no weight gain within 8 days. One group of chickens so infected is kept as untreated control; one group is treated with such doses of a commercial coccidostatic agent as to give 100 percent survivors and a weight gain of about 65–85 percent of body weight within 8 days; and the third group is treated with the compound to be tested, which is considered to be active when producing 90–100 percent survivors and a weight gain of at least 50 percent within 8 days. The commercial coccidostatic agent and the compound to be tested are mixed with the feed (soybean flour and commercial chicken starter) in various concentrations and are administered ad libitum. When tested in this manner the carbamates of this invention are found to be active in concentrations of 0.05 percent.

The carbamates of this invention may be prepared in a convenient manner by the following route.

The starting materials of Formula II are first prepared by treating furan with an alkali metal alkyl, preferably butyllithium, and reacted with a carbonyl compound of the formula $R^1R^2CO$ in which $R^1$ and $R^2$ are as defined in the first instance, except that they may also represent together with the group CO the cyclohexanone ring to obtain the correspondingly substituted 2-furylmethanol. Said last-named compound is treated with an oxidizing agent such as, for example, a peracid or a N-haloacetamide or N-halosuccinimide preferably peracetic or m-chloroperbenzoic acid, to yield the correspondingly substituted compound of Formula II.

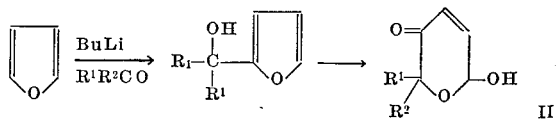

The preparation of the N-monosubstituted carbamates of Formula I in which $R^3$ is as defined in the first instance and $R^4$ is hydrogen may be effected in the following manner:

A suitably substituted 6-hydroxy-2H-pyran-3(6H)-one of the Formula II in which $R^1$ and $R^2$ are as defined in the first instance is treated with an isocyanate of the formula $R^3NCO$ in which $R^3$ is as defined in the first instance, to yield the corresponding carbamates of Formula I in which $R^1$, $R^2$ and $R^3$ are as defined in the first instance and $R^4$ represents hydrogen. This reaction is usually carried out in an inert solvent in the presence of a basic condensing agent. Preferred reaction conditions include the use of an aromatic hydrocarbon solvent such as, for example, benzene, and of sodium acetate, pyridine or triethylamine as the basic condensing agent, at temperatures at or about room temperature, and for periods of time of from one-half to several hours. Evaporation of the solvent or addition of an aliphatic hydrocarbon such as hexane yields the desired intermediate carbamate of Formula I in which $R^4$ is hydrogen.

The N,N-disubstituted carbamates of Formula I in which $R^4$ is lower alkyl, phenyl or 4-chlorophenyl may be prepared by treating the starting material of Formula II in which $R^1$ and $R^2$ are as defined in the first instance except that $R^1$ is other than α-hydroxybenzyl with a carbamoyl chloride of formula $R^3R^4NCOCl$ in which $R^3$ is as defined in the first instance and $R^4$ is lower alkyl, phenyl or 4-chlorophenyl. This reaction is usually carried out in an inert solvent in the presence of a basic condensing agent. Preferred reaction conditions include the use of a solvent such as, for example, benzene, t-butanol, or tetrahydrofuran, and of sodium hydride, sodium hydroxide, potassium t-butoxide, pyridine or triethylamine as the basic condensing agent, at temperatures of from 20 to 40° C., and for periods of 10 minutes to several hours. Thereafter the reaction mixture is rendered neutral by the addition of an acid, for example, acetic acid, the precipitated salt is removed by filtration and the desired N,N-disubstituted carbamate of Formula I in which $R^4$ is lower alkyl, phenyl or 4-chlorophenyl is isolated from the filtrate. Purification of the product may be achieved by chromatography on silica gel and crystallization.

The carbamoyl chlorides of formula $R^3R^4NCOCl$ used in the above process are either commercially available or may be prepared by known methods; see for example, R. J. Slocombe, et al., J. Am. Chem. Soc., 72, 1888 (1950).

The following examples will illustrate this invention.

EXAMPLE 1

Substituted 2-furylmethanols

A freshly prepared cold solution of n-butyllithium in dry ether is added to a molar excess of freshly distilled furan dissolved in about 9 parts of dry ether. The mixture is stirred at 10–15° C. for one hour under a blanket of nitrogen, and 0.9 molar equivalent of the carbonyl compound $R^1R^2CO$, optionally dissolved in about 3–4 parts of ether, is added slowly with stirring while keeping the temperature at 5–10° C., and the mixture is allowed to stand at room temperature for 1–24 hours. Water in tetrahydrofuran is added, the ether layer is separated, washed with bicarbonate and water, dried, and evaporated to yield the desired substituted 2-furylmethanol.

In this manner, when using the carbonyl compounds listed below, the following substituted 2-furylmethanols are obtained. When cyclohexanone is used as the carbonyl compound, the product obtained is 1-(2'-furyl)-cyclohexan-1-ol.

| Carbonyl compound | 2-furylmethanol |
|---|---|
| Benzaldehyde | α-Phenyl-2-furyl methanol, oil, $\gamma_{max}^{Film}$ 3,550, 16,00, 725, 690 cm.$^{-1}$. |
| α-chloroacetophenone | α-Chloromethyl-α-phenyl- 2-furylmethanol oil, $\gamma_{max}^{Film}$ 3,525, 1,450, 14,25, 1,000, 730, 700 cm.$^{-1}$. |
| 3,4-dimethylbenzophenone | α-Phenyl-α-(3, 4-xylyl)-2-furylmethanol, oil, $\gamma_{max}^{Film}$ 3,520, 1,615 cm.$^{-1}$. |
| p-Benzylozybenzaldehyde | α-(p-Benzylozyphenyl)-2-furylmethanol, M.P. 77–78° C. (etherhexane). |
| Deoxybenzoin | α-Benzyl-α-phenyl-2-furylmethanol, oil, $\gamma_{max}^{Film}$ 3,530, 3,420, 16,000, 1,490 cm.$^{-1}$. |
| Benzoylphenylcarbinol | α-(α-Hydrozybenzyl)-α-phenyl-2-furyl-methanol, oil, $\gamma_{max}^{CHCl_3}$ 3,590, 3,520, 1,600, 1,495, 700 cm$^{-1}$. |
| Diphenylacetaldehyde | α-Diphenylmethyl-2-furylmethanol, oil, $\gamma_{max}^{Film}$ 3,540, 3,400, 1,600 cm.$^{-1}$. |
| p-Phenylacetophenone | α-(4-biphenylyl)-α-methyl-2-furylmethanol, M.P. 54–56° C. (ether-pentane). |
| p-Phenylpropiophenone | α-(4-biphenylyl)-α-ethyl-2-furylmethanol, oil, $\gamma_{max}^{Film}$ 3,560, 3,450, 1,610 cm.$^{-1}$ |
| p-Phenylbutyrophenone | α-(4-biphenylyl)-α-n-propyl-2-fruyl methanol, $\gamma_{max}^{Nujol}$ 3,550, 1,605 cm.$^{-1}$. |
| 4-(p-chlorophenyl)-acetophenone. | α-[(4'-chloro-(4-biphenylyl)]-α-methyl-2-furylmethanol, M.P. 84–85° C. (ether-hexane). |
| Cyclohexanone | 1-(2'-furyl)-cyclohexan-1-ol, B.P. 106–107° C./13 mm. |

EXAMPLE 2

2-substituted 6-hydroxy-2H-pyran-3(6H)-ones (II)

The substituted 2-furylmethanol prepared as described in Example 1 is dissolved in 15–25 parts of chloroform, the solution is cooled to 0°–5° C., 1.1–1.85 molar equivalents of peracetic, m-chloroperbenzoic, or p-nitroperbenzoic acid are added in small portions with constant stirring while keeping the temperature below 5° C., the mixture is stirred at room temperature for 30–90 minutes, and cooled in an ice bath. The precipitate is filtered and the filtrate washed successively with 10% aqueous solutions of potassium iodide, 10% sodium thiosulfate, 10% sodium bicarbonate, and water, dried with anhydrous magnesium sulfate, and evaporated. The residue is purified by chromatography on silica gel or by crystallization to yield the desired 2-substituted 6-hydroxy-2H-pyran-3(6H)-one. In this manner, when using the substituted 2-furylmethanols listed below, the following 2-substituted 6-hydroxy-2H-pyran-3(6H)-ones are obtained. When using 1-(2'-furyl)-cyclohexan-1-ol as starting material, the product obtained is 2,2-pentamethylene-6-hydroxy-2H-pyran-3(6H)-one.

| Substituted 2-furylmethanol | 2-substituted 6-hydroxy-2H-pyran-3(6H)-one |
|---|---|
| α-Phenyl- | 2-phenyl-, M.P. 74–75° C. (ether-hexane). |
| α-Chloromethyl-α-phenyl | 2-chloromethyl-2-phenyl-, M.P. 121–122° C. (ether-hexane). |
| α-Phenyl-α-(3,4-xylyl) | 2-phenyl-2-(3,4-xylyl)-, M.P. 158–160° C. (ether-hexane). |
| α-(p-Benzyloxyphenyl) | 2-(p-benzyloxyphenyl)-, M.P. 92–94° C. (ether-hexane). |
| α-Benzyl-α-phenyl | 2-benzyl-2-phenyl-, M.P. 112–114° C. (methylcyclohexane-xylene). |
| α-(α-Hydroxybenzyl)-α-phenyl. | 2-(α-hydroxybenzyl)-2-phenyl-, M.P. 130–132° C. (acetone-hexane). |
| α-Diphenylmethyl | 2-diphenylmethyl-, M.P. 159–160° C. (acetone-hexane). |
| α-(4-biphenylyl)-α-methyl | 2-(4-biphenylyl)-2-methyl-, M.P. 166–167° C. (acetone-hexane). |
| α-(4-biphenylyl)-α-ethyl | 2-(4-biphenylyl)-2-ethy-, M.P. 159–160° C. (acetone-hexane). |
| α-(4-biphenylyl)-α-n-propyl | 2-(4-biphenylyl)-2-n-propyl-, M.P. 147° C. (ethyl acetate-hexane). |
| α-[4'-chloro-(4-biphenylyl)]-α-methyl-. | 2-[4'-chloro-(4-biphenylyl)]-2-methyl-, M.P. 159–160° C. (acetone-hexane). |
| 1-(2'-furyl)-cyclohexan-1-ol | 2,2-pentamethylene-, B.P. 115–118° C./0.07 mm. |

EXAMPLE 3

2-substituted 6-hydroxy-2H-pyran-3(6H)-one N-substituted carbamates (III, R4=H)

A solution of the 2-substituted 6-hydroxy-2H-pyran-3(6H)-one obtained as described in Example 2 in 10–50 parts of benzene or 25–35 parts of chloroform or 30–40 parts of ether is stirred at room temperature for 0.5–24 hours with 1.5–3.5 molar equivalents of an isocyanate of the formula $R^3NCO$ in which $R^3$ is as defined in the first instance and 0.25–5 molar equivalents of triethylamine or 0.1–4 molar equivalents of pyridine. The mixture is evaporated under reduced pressure to about ⅔ of its original volume, filtered, the filtrate is washed with water, dried over anhydrous magnesium sulfate, and evaporated. Chromatography on silica gel or crystallization of the residue yields the desired carbamate of Formula III. In this manner, when using the 2-substituted 6-hydroxy-2H-pyran-3(6H)-ones and the isocyanates listed below, the following 2-substituted 6-hydroxy-2H-pyran-3(6H)-one N-substituted carbamates are obtained. When using 2,2-pentamethylene-6-hydroxy-2H-pyran-3(6H)-one and phenyl isocyanate the corresponding N-phenyl carbamate is obtained.

| 2-substituted 6-hydroxy-2H-pyran-3(6H)-one. | Isocyanate $R^3NCO$ $R^3=$ | 2-substituted 6-hydroxy-2H-pyran-3(6H)-oneN-substituted carbamate |
|---|---|---|
| 2-phenyl- | Phenyl | 2-phenyl-, N-phenyl carbamate, M.p. 152–154° C. (toluene). |
| 2-chloromethyl-2-phenyl-. | Methyl | 2-chloromethyl-2-phenyl-, N-methyl carbamate, M.p. 184–185° C. (acetone-hexane). |
| 2-phenyl-2-(3,4-xylyl)-. | N-butyl | 2-phenyl-2-(3,4-xylyl)-, N-butyl carbamate, $\gamma_{max}^{CHCl_3}$ 3,450, 1,740, 1,695 cm.$^{-1}$. |
| Do | Phenyl | 2-phenyl-2-(3,4-xylyl)-, N-phenyl carbamate, $\gamma_{max}^{CHCl_3}$ 3,440 1,750 1,693 cm.$^{-1}$. |
| 2-(p-benzyloxy phenyl)-. | Methyl | 2-(p-benzyloxyphenyl)-, N-methyl carbamate, M.P. 141–142° C. (acetone-hexane). |
| 2-benzyl-2-phenyl | Phenyl | 2-benzyl-2-phenyl-, N-phenyl carbamate, $\gamma_{max}^{CHCl_3}$ 3,445, 1,750, 1,695 cm.$^{-1}$. |
| 2-(α-hydroxybenzyl)-2-phenyl. | Methyl | 2-(α-hydroxybenzyl)-2-phenyl-, N-methyl carbamate, M.P. 140–141° C., (acetone-hexane). |
| 2-(diphenylmethyl)- | do | 2-diphenylmethyl-, N-methyl carbamate, M.P. 166–167° C. (ether or methanol). |
| 2-(4-biphenylyl)-2-methyl-. | do | 2-(4-biphenylyl)-2-methyl-, N-methyl carbamate, M.P. 127–128° C., (acetone-hexane). |
| 2-(4-biphenylyl)-2-ethyl-. | do | 2-(4-biphenylyl)-2-ethyl-, N-methyl carbamate, M.P. 123–124° C. (ethyl acetate-hexane). |
| 2-(4-biphenylyl)-2-n-propyl-. | do | 2-(4-biphenylyl)-2-n-propyl-, N-methyl carbamate, M.P. 108–110° C. (ethyl acetate-hexane). |
| 2-(4-biphenylyl)-2-methyl-. | Ethyl | 2-(4-biphenylyl)-2-methyl-, N-ethyl carbamate, M.P. 90–92° C. (acetone-hexane). |
| 2-(4-biphenylyl)-2-methyl-. | n-Propyl | 2-(4-biphenylyl)-2-methyl-, N-propyl carbamate, M.P. 100–101° C. (toluene-hexane). |
| Do | n-Butyl | 2-(4-biphenylyl)-2-methyl-, N-butyl carbamate, M.P. 83–84° C. (hexane). |
| Do | Phenyl | 2-(4-biphenylyl)-2-methyl-, N-phenyl carbamate, M.P. 146–147° C. (chloroform-hexane). |
| Do | p-Chlorophenyl. | 2-(4-biphenylyl)-2-methyl-, N-(p-chlorophenyl)carbamate, M.P. 132–133° C. (chloroform-hexane). |
| 2-[4'-chloro-(4-(4-biphenylyl)]-2-methyl. | Methyl | 2-[4'-chloro-(4-biphenylyl)]-2-methyl-,N-methyl carbamate, M.P. 151–152° C. (acetone-hexane). |
| 2,2-pentamethylene- | Phenyl | 2,2-pentamethylene-, N-phenyl carbamate $\gamma_{max}^{CHCl_3}$ 1,750 cm.$^{-1}$. |

EXAMPLE 4

2-substituted-6-hydroxy - 2H - pyran-3-(6H)-one N,N-disubstituted carbamates (III, R4=lower alkyl, phenyl or p-chlorophenyl)

The 2-substituted-5-hydroxy-2H-pyran-3(6H)-one obtained as described in Example 2 is added to a suspension of 1.1 to 5.0 molar equivalents of sodium hydride in 20 to 100 parts of benzene cooled to 10° C. The mixture is stirred at room temperature for 30 minutes to 24 hours. The mixture is then heated slowly to 30–40° C. and kept at this temperature until the evolution of hydrogen ceases. Thereafter 1.1 to 1.5 molar equivalents of a carbamoyl chloride of formula R³R⁴NCOCl in which R³ and R⁴ are the same or different selected from the group consisting of lower alkyl, phenyl or p-chlorophenyl is added slowly at 30° C. giving a mild exothermic reaction. The mixture is cooled to 10° C. and rendered neutral by the addition of acetic acid. The mixture is filtered and the filtrate is poured onto a column of silica gel (40 parts). Elution with 2 to 5% ethyl acetate in benzene and evaporation of the eluent affords the desired 2-substituted-6-hydroxy-2H-pyran-3(6H)-one N,N-disubstituted carbamate. In this manner, when using the 2-substituted 6-hydroxy-2H-pyran-3(6H)-ones and the carbamoyl chlorides listed below the following 2-substituted-6-hydroxy-2H-pyran-3(6H)-one N,N-disubstituted carbamates are obtained.

| 2-substituted 6-hydroxy-2H-pyran-3(6H)-one | Carbamoyl chloride of formula R³R⁴NCOCl | | 2-substituted-6-hydroxy-2H-pyran-3(6H)-one N,N-disubstituted carbamate |
|---|---|---|---|
| | R³ | R⁴ | |
| 2-phenyl- | Phenyl | Phenyl | 2-phenyl-, N,N-diphenyl carbamate. |
| 2-chloromethyl-2-phenyl. | Methyl | p-Chlorophenyl. | 2-chloromethyl-2-phenyl-, N-p-chlorophenyl-N-methyl carbamate. |
| 2-phenyl-2-(3,4-xylyl)-. | Butyl | Butyl | 2-phenyl-2-(3,4-xylyl)-, N,N-dibutyl carbamate. |
| Do | Phenyl | p-Chlorophenyl. | 2-phenyl-2-(3,4-xylyl)-, N-p-chlorophenyl-N-phenyl carbamate. |
| 2-(p-benzyloxyphenyl)-. | Methyl | Methyl | 2-(p-benzyloxyphenyl)-, N,N-dimethyl carbamate. |
| 2-benzyl-2-phenyl. | Phenyl | Phenyl | 2-benzyl-2-phenyl-, N,N-diphenyl carbamate. |
| 2-(diphenylmethyl). | Methyl | Propyl | 2-(diphenylmethyl)-, N-methyl-N-propyl carbamate |
| 2-(4-biphenyl)-2-methyl-. | ...do | Methyl | 2-(4-biphenylyl)-2-methyl-, N,N-dimethyl carbamate, M.P. 120-122° C., (methylenedichloride-hexane). |
| 2-(4-biphenylyl)-2-ethyl-. | ...do | do | 2-(4-biphenylyl)-2-ethyl-, N,N-dimethyl carbamate, M.P. 129-130° C. (ether). |
| 2-(4-biphenylyl)-2-ethyl-. | Methyl | Methyl | 2-(4-biphenylyl)-2-ethyl-, N,N-dimethyl carbamate. |
| 2-(4-biphenylyl)-2-n-propyl-. | ...do | Butyl | 2-(4-biphenylyl)-2-n-propyl-, N-butyl-N-methyl carbamate. |
| 2-(4-biphenylyl)-2-methyl-. | Ethyl | Ethyl | 2-(4-biphenylyl)-2-methyl-, N,N-diethyl carbamate, M.P. 116-117° C. (methylenedichloride-hexane). |
| Do | Methyl | Phenyl | 2-(4-biphenylyl)-2-methyl-, N-methyl-N-phenyl carbamate, M.P. 126-128° C. (ether). |
| Do | Phenyl | do | 2-(4-biphenylyl)-2-methyl-, N,N-diphenyl carbamate, M.P. 180-182° C. (methylenedichloride-hexane). |
| Do | Ethyl | do | 2-(4-biphenylyl)-2-methyl-, N-ethyl-N-phenyl carbamate. |
| Do | p-Chlorophenyl. | p-Chlorophenyl. | 2-(4-biphenylyl)-2-methyl-, N,N-di(p-chlorophenyl)-carbamate. |
| 2-[4'-chloro-(4-biphenylyl)]-2-methyl-. | Methyl | Methyl | 2-[4'-chloro-(4-biphenylyl)]-2-methyl-, N,N-dimethyl carbamate. |
| 2,2-pentamethylene. | Phenyl | Phenyl | 2,2-pentamethylene-, N,N-diphenyl carbamate. |

I claim:
1. A compound of the formula

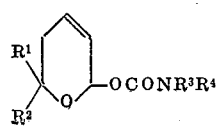

wherein R¹ is selected from the group which consists of phenyl, 3,4-xylyl, benzoyloxyphenyl, α-hydroxybenzyl, diphenylmethyl, 4-biphenyl and 4'-chloro-4-biphenylyl; R² is selected from the group which consists of hydrogen, lower alkyl, chloromethyl, phenyl, and benzyl; or R¹ and R² together represent the cyclohexane ring attached in spiral fashion to the pyranone ring in such a manner that carbon atom 2 of the pyranone ring is common to the cyclohexane ring; R³ is selected from the group which consists of lower alkyl, phenyl and 4-chlorophenyl; and R⁴ is selected from the group which consists of hydrogen, lower alkyl, phenyl, and p-chlorophenyl, with the proviso that R⁴ is hydrogen when R¹ is α-hydrobenzyl.

2. 2-(4-biphenylyl)-2-methyl - 6 - hydroxy-2H-pyran-3(6H)-one N-methyl carbamate, as claimed in claim 1.

3. 2-phenyl-6-hydroxy-2H-pyran-3-(6H)-one N - phenyl carbamate, as claimed in claim 1.

4. 2 - Chloromethyl-2-phenyl - 6 - hydroxy-2H-pyran-3(6H)-one N-methyl carbamate, as claimed in claim 1.

5. 2-Phenyl-2-(3,4-xylyl)-6-hydroxy-2H-pyran-3(6H)-one N-butyl carbamate, as claimed in claim 1.

6. 2-phenyl-2-(3,4-xylyl)-6-hydroxy-2H-pyran-3(6H)-one N-phenyl carbamate, as claimed in claim 1.

7. 2-(p-benzyloxyphenyl)-6-hydroxy-2H-pyran-3(6H)-one N-methyl carbamate, as claimed in claim 1.

8. 2 - benzyl-2-phenyl-6-hydroxy-2H-pyran-3(6H)-one N-phenyl carbamate, as claimed in claim 1.

9. 2-(α-hydroxybenzyl)-2-phenyl-6-hydroxy-2H-pyran-3(6H)-one N-methyl carbamate, as claimed in claim 1.

10. 2-(diphenylmethyl)-6-hydroxy - 2H - pyran-3(6H)-one N-methyl carbamate, as claimed in claim 1.

11. 2-(4-biphenylyl) - 2 - ethyl-6-hydroxy - 2H - pyran-3(6H)-one N-methyl carbamate, as claimed in claim 1.

12. 2-(4 - biphenylyl)-2-n-propyl-6-hydroxyl-2H-pyran-3(6H)-one N-methyl carbamate, as claimed in claim 1.

13. 2-(4-biphenylyl)-2-methyl - 6 - hydroxy-2H-pyran-3-(6H)-one N-ethyl carbamate, as claimed in claim 1.

14. 2-(4-biphenylyl)-2-methyl - 6 - hydroxy-2H-pyran-3(6H)-one N-propyl carbamate, as claimed in claim 1.

15. 2-(4-biphenylyl)-2-methyl - 6 - hydroxy-2H-pyran-3(6H)-one N-butyl carbamate, as claimed in claim 1.

16. 2-(4-biphenylyl)-2-methyl - 6 - hydroxy-2H-pyran-3(6H)-one N-phenyl carbamate, as claimed in claim 1.

17. 2-(4-biphenylyl)-2-methyl - 6 - hydroxy-2H-pyran-3(6H)-one N-(p-chlorophenyl)carbamate, as claimed in claim 1.

18. 2[4'-chloro-(4 - biphenylyl)]-2-methyl-6-hydroxy-2H-pyran-3(6H)-one N-methyl carbamate, as claimed in claim 1.

19. 2,2-pentamethylene - 6 - hydroxy-2H-pyran-3(6H)-one N-phenyl carbamate, as claimed in claim 1.

20. 2-(4-biphenylyl)-2-methyl - 6 - hydroxy-2H-pyran-3(6H) - one N,N - dimethyl carbamate, as claimed in claim 1.

21. 2-(4 - biphenylyl)-2-ethyl-6-hydroxy - 2H - pyran-3(6H) - one N,N - dimethyl carbamate, as claimed in claim 1.

22. 2-(4-biphenylyl)-2-methyl - 6 - hydroxy-2H-pyran-3(6H)-one N,N-diethyl carbamate, as claimed in claim 1.

23. 2-(4-biphenylyl)-2-methyl - 6 - hydroxy-2H-pyran-3(6H)-one N-methyl-N-phenyl carbamate, as claimed in claim 1.

24. 2-(4-biphenylyl)-2-methyl - 6 - hydroxy-2H-pyran-3(6H) - one N,N - diphenyl carbamate, as claimed in claim 1.

No references cited.

NORMA S. MILESTONE, Primary Examiner

U.S. Cl. X.R.

260—345.9, 347.8; 424—283